(12) United States Patent
Goel et al.

(10) Patent No.: US 10,970,196 B1
(45) Date of Patent: Apr. 6, 2021

(54) SEMANTIC-AWARE FUZZ-BASED FUNCTIONAL TESTING

(71) Applicant: Amazon Technologies, Inc., Seattle, WA (US)

(72) Inventors: Dhruv Goel, Seattle, WA (US); Pravin Mittal, Redmond, WA (US); Andrew Whitaker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 15/816,618

(22) Filed: Nov. 17, 2017

(51) Int. Cl.
*G06F 11/36* (2006.01)
*G06F 16/242* (2019.01)

(52) U.S. Cl.
CPC ...... *G06F 11/3688* (2013.01); *G06F 11/3684* (2013.01); *G06F 11/3692* (2013.01); *G06F 16/2425* (2019.01)

(58) Field of Classification Search
CPC ............ G06F 11/3688; G06F 11/3684; G06F 11/3692; G06F 16/2425; G06F 11/263
See application file for complete search history.

(56) References Cited

U.S. PATENT DOCUMENTS

| | | | | |
|---|---|---|---|---|
| 5,664,173 A * | 9/1997 | Fast | ............ | G06F 8/42 704/1 |
| 5,819,255 A * | 10/1998 | Celis | ............ | G06F 16/24542 |
| 2008/0319959 A1 * | 12/2008 | Bireley | ............ | G06F 8/447 |
| 2010/0185694 A1 * | 7/2010 | Copty | ............ | G06F 11/3688 707/803 |
| 2010/0192006 A1 * | 7/2010 | Gharat | ............ | G06F 11/3688 714/5.1 |
| 2012/0324289 A1 * | 12/2012 | Funnell | ............ | G06F 11/3688 714/32 |
| 2014/0359581 A1 * | 12/2014 | Soshin | ............ | G06F 11/3692 717/126 |
| 2015/0113330 A1 * | 4/2015 | Grondin | ............ | G06F 11/3684 714/38.1 |
| 2015/0254174 A1 * | 9/2015 | Harding | ............ | G06F 16/176 707/718 |
| 2015/0278057 A1 * | 10/2015 | He | ............ | G06F 11/263 714/33 |
| 2016/0253379 A1 * | 9/2016 | Ford | ............ | G06F 11/362 707/721 |
| 2016/0378675 A1 * | 12/2016 | Giuliani | ............ | G06F 11/3684 711/206 |
| 2017/0075784 A1 * | 3/2017 | Nakanishi | ............ | G06F 11/263 |
| 2017/0132276 A1 * | 5/2017 | Saurabh | ............ | G06F 16/3334 |
| 2017/0300404 A1 * | 10/2017 | Thanabalan | ............ | G06F 16/334 |
| 2017/0337210 A1 * | 11/2017 | Boehme | ............ | G06F 16/2425 |

(Continued)

*Primary Examiner* — Yolanda L Wilson
(74) *Attorney, Agent, or Firm* — Davis Wright Tremaine LLP

(57) ABSTRACT

A database testing system may generate, based on a randomization process, test data for a database. The system may generate a query that, when processed by the database, produces a first result that comprises the row. The system may modify the query based on a randomization process and in view of the semantic properties of the query language associated with the queries. The system may predict the outcome of the modifies query based on the semantic properties and on the generated test data. The system may verify that the modified query, when processed by the database, produces results consistent with the prediction.

20 Claims, 12 Drawing Sheets

(56) References Cited

U.S. PATENT DOCUMENTS

2018/0024701 A1* 1/2018 Sanches .............. G06F 17/2247
　　　　　　　　　　　　　　　　　　　　　715/781
2019/0147086 A1* 5/2019 Pal ...................... G06F 16/2471
　　　　　　　　　　　　　　　　　　　　　707/718

* cited by examiner query 500: SELECT * FROM test_table WHERE ( C1 == 316 ) AND ( C2 == "AGD" ) AND ( C3 == "STTSS" ) AND ( C4 == "Y" )

predicted result 502:
| C1 | C2 | C3 | C4 |
|---|---|---|---|
| 316 | "AGD" | "STTSS" | "Y" | modified query 504: SELECT * FROM test_table WHERE ( C1 >= 315 AND C1 <=322 ) AND ( C2 > "AGD" ) AND ( C3 == "STTSS" ) AND ( C4 IN {"Y", "N"} )

predicted result 506:
| C1 | C2 | C3 | C4 |
|---|---|---|---|
| 316 | "AGD" | "STTSS" | "Y" | modified query 508: SELECT * FROM test_table WHERE C1 < 315 predicted result 510:
| C1 | C2 | C3 | C4 |
|---|---|---|---|

FIG. 5

SEMANTIC-AWARE FUZZ-BASED FUNCTIONAL TESTING

BACKGROUND

The testing of database management systems is a complex technical endeavor. This is due to a number of factors. Database management systems are often highly complex. They may comprise components for communicating with client applications, parsing queries and other commands, generating and optimizing plans for storing and retrieving data, and interacting with storage devices. Database management systems also typically provide a wide variety of features, such as supporting feature-rich query languages, including for example structured query language ("SQL"). Database management systems are also frequently considered to be mission-critical, and as such may require extensive testing to reduce the frequency and effect of programming errors.

Automated approaches to testing database management systems may include functional testing, in which the correctness of the database's operation are evaluated. For example, test cases may be executed against the database to determine if the features supported by the database are operating as defined by a specification, or are otherwise operating as desired. Another approach to testing involves detecting security vulnerabilities. This may involve a technique, sometimes referred to as "fuzz testing," in which invalid test cases are automatically generated and executed, typically using randomization.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

FIG. 5 depicts an embodiment modifying queries.

DETAILED DESCRIPTION

Figure 1:
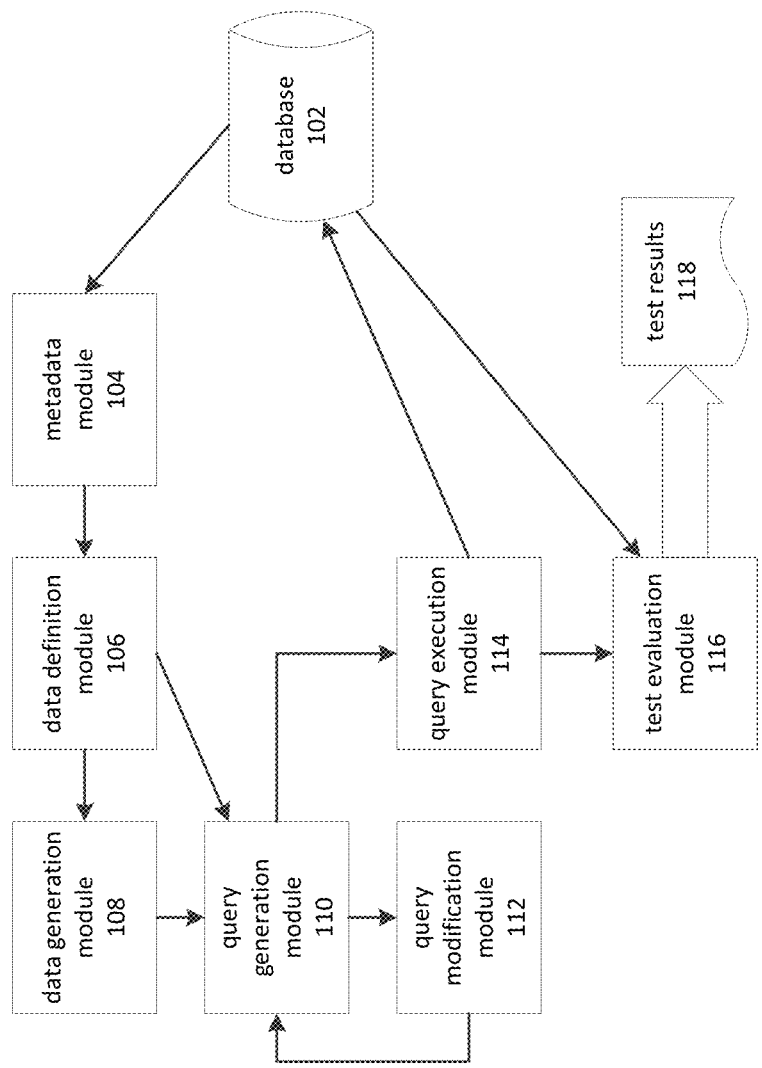
FIG. 1 depicts an embodiment of a database testing system.

Described herein are techniques related to the functional testing of a database management system. Functional testing involves various technological approaches to evaluating the features and operation of a database management system. Typically, functional testing involves executing valid test cases to determine if the features of the database are operating as intended. In contrast, testing for security vulnerabilities, particularly using fuzz testing, involves the execution of test cases which are invalid, in the sense that they test the database's reaction to unexpected or nonsensical input, rather than testing the designed features of the database. Because fuzz testing is generally directed to invalid test cases, the techniques associated with it are not typically employed to do functional testing.

In an embodiment, a system comprises a memory to store machine-readable instructions. The instructions, as a result of being performed by a processor, cause the system to perform operations comprising generating a row of a database table using a randomization process. The operations further comprise generating a query that, when processed by the database, is predicted to produce a result that comprises the row. The system may, for example, generate the query in accordance with the semantics of the query language so that the query comprises instructions to select the generated row. The system then performs operations to generate an additional query based on modifying the initial query. For example, the system may mutate or modify the initial query based on a randomization processes and in view of the semantics of the query language, such that the predicted result of processing the modified query is also to return the generated row, even though the query was modified. The embodiment of the system may then verify that the modified query, when actually processed by the database, produces the predicted result. If not, the failure may be logged, a notification generated, or other action taken.

In an embodiment, a method of testing a database comprises generating test data and generating a query that, when performed based at least in part on the test data, is predicted to produce a result. For example, the generated test data might be a row of a database table, and the predicted result might be for the query to return the generated row. More generally, the result may be predicted based on knowledge of the generated test data and on the semantics of the query language. The embodiment of the method further comprises generating, based at least in part on the query, a second query to produce, when performed based at least in part on the test data, a second result having a predicted correspondence to the first result, and verifying that performing the second query produces the second result. The predicted correspondence refers to the second result being determinable a priori based on the test data and/or the first result, and also based on the semantics of the query language. For example, in some cases and embodiments the second result may be predicted to be equal to the first result, to be the inverse of the first result, and so on.

In an embodiment, additional test data and queries are generated through an iterative process. For example, in an embodiment, generation of test data is followed by the generation and processing of a series of queries, each modified based on the prior query in the series. In an embodiment, this process is periodically reset, at which time new test data and a new initial query are generated.

FIG. 1 depicts an embodiment of a database testing system. In an embodiment, a database testing system 100 is operable to test aspects of a database 102. The testable aspects of the database 102 may include, but are not necessarily limited to, functional, security, stress, and performance aspects. In cases and embodiments, these aspects are tested by successive evaluation of queries by the database 102.

In an embodiment, the database 102 is a system for maintaining a collection of data. Examples include relational database systems, key-value database systems, spatial database systems, online analytical processing systems, data warehouses, and document repositories. In further embodiments, the database 102 may comprise knowledge management systems, expert systems, natural language systems, and so forth.

In an embodiment, the database 102 processes an expression, which may also be referred to as a query, or statement, to produce a result. In cases and embodiments, the expression comprise one or more statements in a query language, such as structured query language ("SQL"), extended markup language ("XML") query expressions, multi-dimensional query expressions, spatial query expressions, and so forth. In cases and embodiments, the expressions may be natural language statements representable by an expression tree or other equivalent structure.

In an embodiment, the database 102 selects a result set based on the query. For example, the database 102 may process the SQL query "select * from table_x," resulting in the selection of a result set comprising all of the rows contained in table_x. Here, selection refers to locating and returning data stored in a table maintained by the database 102.

In an embodiment, the database testing system 100 may test aspects of the database 102 by generating test data and a query that, at least originally, is paired with the test data. For example, the query may be generated so that, when performed based on the test data, it produces a known, i.e. predicted, result. In cases and embodiments, the test data corresponds to one or more rows of a database table, and the query is a database query that instructs the database 102 to select each of the one or more rows. Aspects of the database 102 may be tested by causing the database 102 to attempt to evaluate the query and determining whether or not each of the one or more rows were, in fact, selected. Further evaluation of the database 102 comprises generating a second query based on the first query. The second query is generated so that, when it is processed by the database 102 using the test data, it produces a result that corresponds in some known way to the first result. The result of processing the second query may, for example, be a subset, opposite, inverse, converse, obverse, or negation of the result of evaluating the original or prior query. The second query is generated so that the second result of processing the second expression can be predicted based on a priori knowledge of the randomized test data and on the semantics of the query language.

In an embodiment, the database testing system 100 comprises a metadata module 104, a data definition module 106, and a data generation module 108. The metadata module 104 obtains information about the database 102 that may be used to generate a set of test data. For example, the metadata module 104 may identify data types supported by the database 102, and the data definition module 106 may determine various characteristics of the test data based at least in part on the supported data types. For example, if the database 102 supported six different data types, and it was desired to test the operation of the database 102 in relation to each of the data types, the data definition module 106 might determine that the test data should comprise rows having one column for each of the six data types. The data generation module 108 might then use randomization techniques, such as a pseudo-random number generator, to generate test data that comprises rows with each of the six columns.

In an embodiment, an query generation module 110 generates a query that based on the generated test data. In an embodiment, the query generation module 110 generates the query so that when the query is processed by the database 102, a row comprising the test data is selected. More generally, in cases and embodiments, the query generation module 110 generates a query that produces a known result when processed by the database 102 based on the generated test data.

In an embodiment, an query execution module 114 causes the query to be processed by the database 102. For example, in cases and embodiments the query is a database query. The database query is processed by the database 102 and a set of results is returned to the query execution module 114. In an embodiment, the test evaluation module 116 examines the results and determines whether or not they are consistent with the expected results.

In an embodiment, a query modification module 112 may generate a second query based on an initial or prior query. For example, in cases and embodiments the initial query may comprise a filter clause. The subsequent query may comprise a modified version of the filter clause, such that the expected result of evaluating the subsequent query corresponds to the expected result of evaluating the initial query. In this context, correspondence refers to the expected result being known or predictable, given a priori knowledge of the query and the test data. For example, if the prior query returns a particular row when evaluated by the database 102, the database testing system 100 may determine to generate the expression such that it returns the same particular row. In other cases, the database testing system 100 may determine to generate the query so that it does not return the row.

In an embodiment, the test evaluation module 116 may output test results 118 based on whether or not the results obtained from evaluating the queries conform to the expected results. A test may be said to have "passed" when the expected results conforms to the actual results. In an embodiment, the test results 118 comprise a record of an query that was executed by the database 102, a record of the expected result, and a record of the actual result. Embodiments of the test results 118 may also comprise statistics such as pass/fail rates, code coverage data, and so forth.

Figure 2:
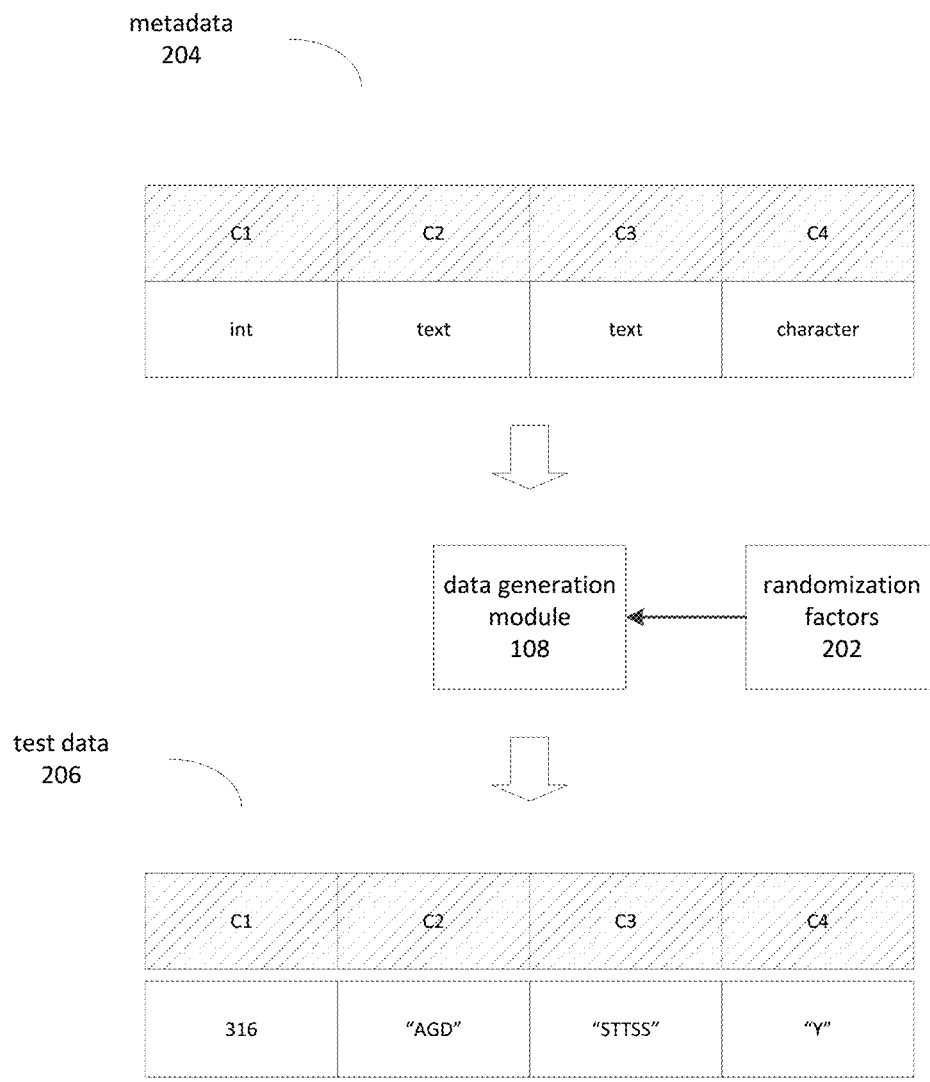
FIG. 2 depicts an embodiment of a database testing system generating test data.

FIG. 2 depicts an embodiment of a database testing system generating a tuple of test data 206. The tuple may comprise one or more values. In an embodiment, the type of each value are chosen from a set of possible types based on a randomization factor. In an embodiment, the set of possible types is determined based on the types supported by the database management system being tested.

In an embodiment, a data generation module 108 receives metadata 204. The metadata 204 comprises information describing the types supported by the database being tested, such as the database 102 depicted in FIG. 1. In an example case and embodiment, the database may support a number of different data types, such as int, text, character, Boolean, and so on. In an embodiment, the data generation module 108 might determine to generate test data 206 comprising four columns C1-C4. For each of these columns, the data generation module 108 selects a type at random. For example, as depicted in FIG. 2, the data generation module 108 may select, based on randomization factors 202, the data types 'int,' 'text,' 'text,' and 'character,' respectively.

In an embodiment, a value of each of the columns C1-C4 is generated according to the corresponding data type and the randomization factors 202. For example, the value of column C1 of the test data 206 might be selected from the range of possible values for the data type 'int.' In an embodiment, the range of possible values for a data type is constrained by the number of bits or bytes allocated to the data type. For example, if two bytes were allocated to each 'int' there might be 2^16 possible values. It will be appreciated that this example is merely illustrative, and should not be construed as limiting.

In an embodiment, the test data 206 is stored within a row of a database table. For example, consistent with the example depiction of test data 206 in FIG. 2, the database testing system 100 might store a database row with the values {316, "AGD," "STTSS," "Y"}.

Figure 3:
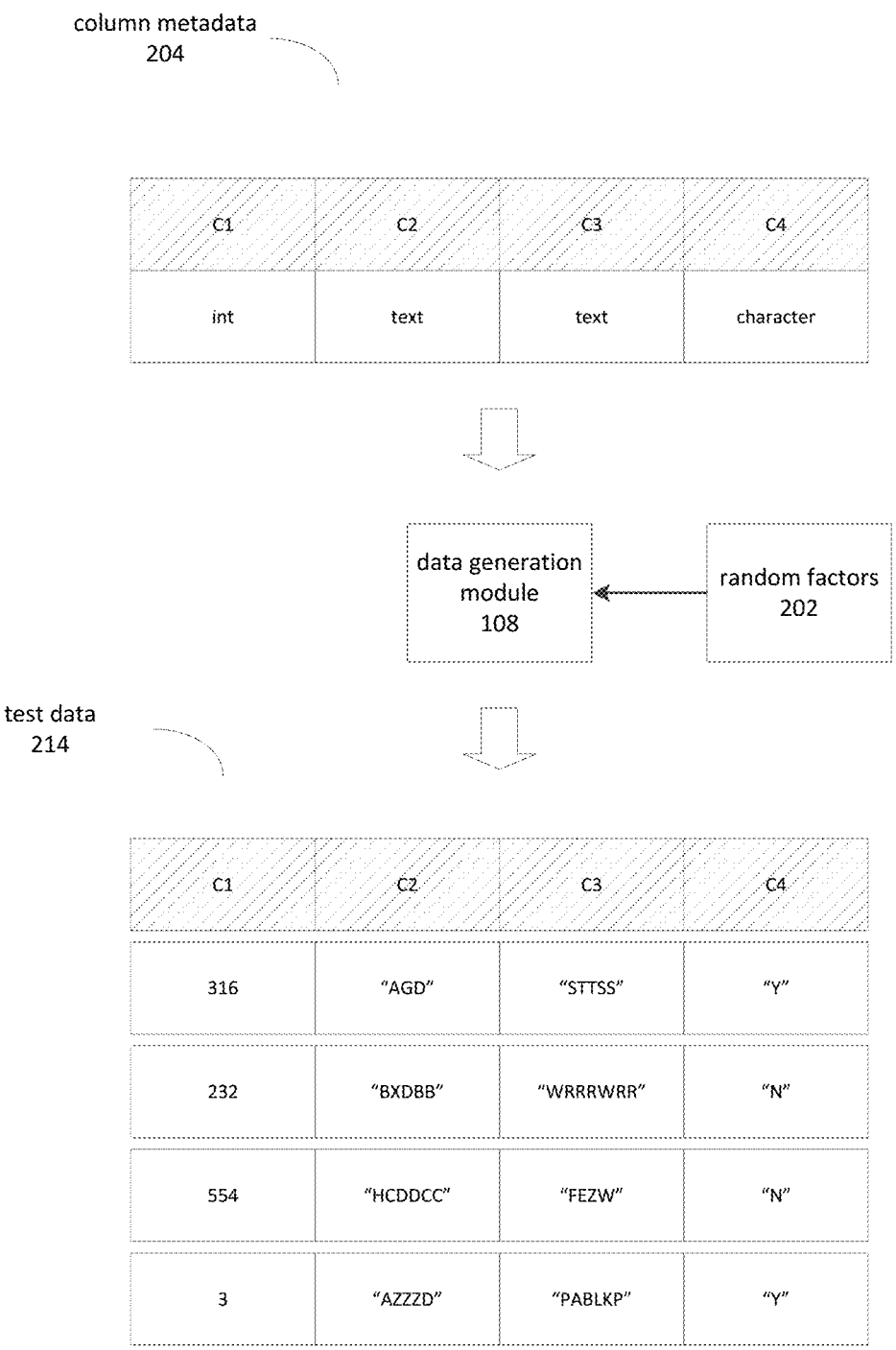
FIG. 3 depicts an embodiment of a database testing system generating test data comprising a plurality of tuples.

In an embodiment, the test data may comprise a plurality of tuples. FIG. 3 depicts an embodiment of a database testing system generating test data comprising a plurality of tuples. In various embodiments, the test data 214 of FIG. 3 is generated similarly to the test data 206 of FIG. 3, repeated to generate multiple rows.

Figure 4:
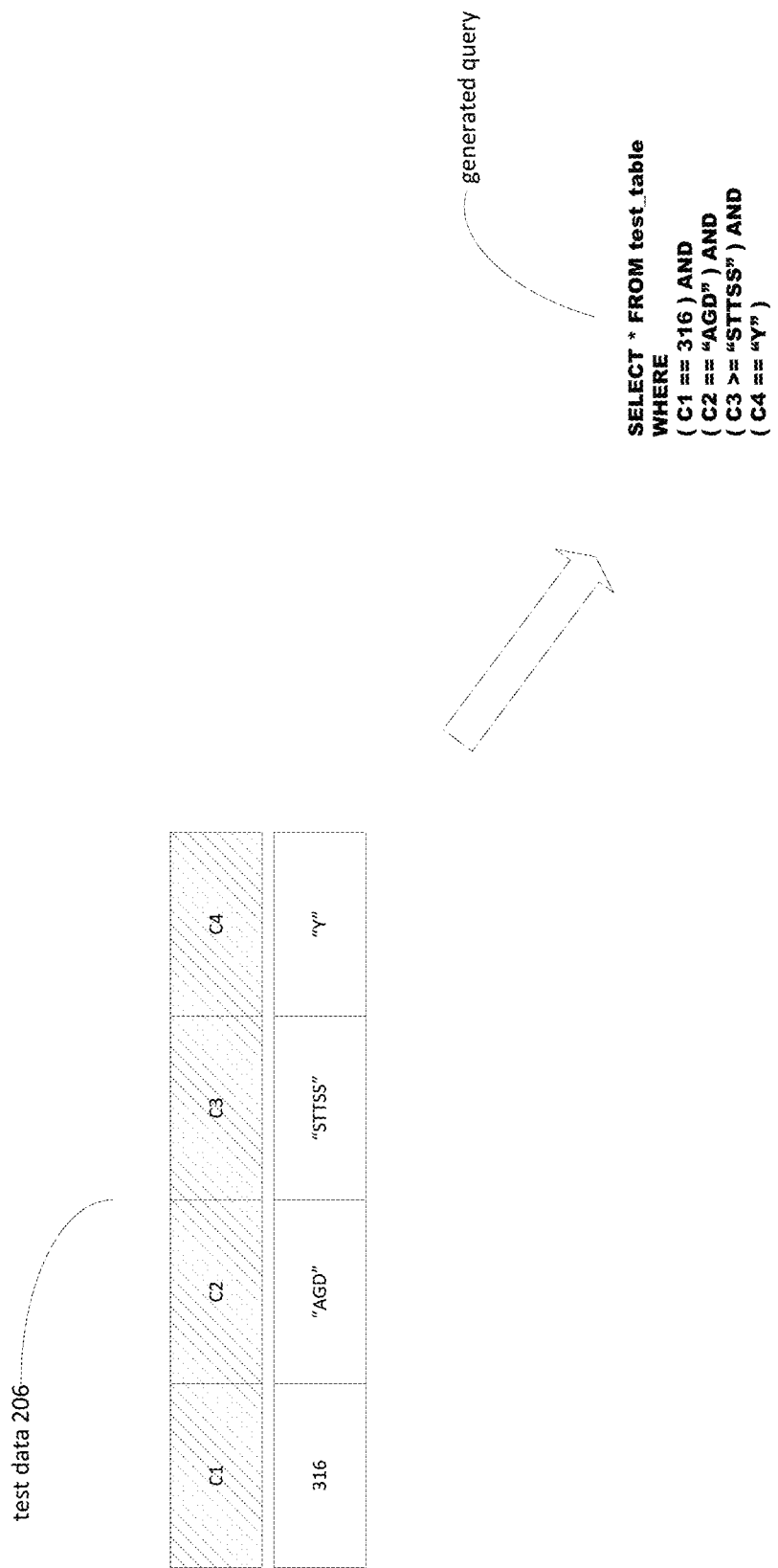
FIG. 4 depicts an embodiment of a database testing system generating a query based on test data.

FIG. 4 depicts an embodiment of a database testing system generating a query based on test data. In an embodiment, the database testing system 100 generates a query having a predicted result. Here, predicted refers to what the result of the query is intended to be, barring any faults, errors, or other problems which might be uncovered by executing the generated query. For example, based on the randomly generated test data 206 having values {316, "AGD," "STTSS," "Y"}, the database testing system 100 might generate a query 400 comprising:

SELECT * FROM test table WHERE
(C1==316) AND (C2=="AGD") AND (C3>="STTSS") AND (C4=="Y")

This query, when executed against a database table having a row with the values {316, "AGD," "STTSS," "Y"} obtained from test data 206, may be expected to return at least that row, or perhaps only that row—embodiments may, in some cases, take steps to ensure that rows based on generated test data are unique.

FIG. 5 depicts an embodiment modifying queries. In an embodiment, a second query may be generated by modifying an initial or previous query and predicting the result of the modified query based on the modified query and the test data. In an embodiment, the second query is modified to produce a predicted result. In other words, a database testing system may predict the result of a modified query prior to or following the generation of the modified query. In either case, the second query is predicted to result in a certain outcome when it is executed based on the known test data.

In an embodiment, a query 500 may be generated so that, when executed against a known set of test data, it is expected to return predicted results 502—even if it ultimately does not, due to an error in the database's operation. As depicted in FIG. 5, the query 500 comprises instructions to select a row having column values that precisely match the generated test data 206. Assuming that the query is directed to a test table pre-loaded with a row having column values corresponding to the test data, the predicted result 502 of executing the query 500 is that row, and in typical cases and embodiments, only that row.

In an embodiment, a modified query 504 is generated based on the original query 500. As depicted in FIG. 5, the WHERE clause of the modified query 504 has been altered. For example, rather than containing the filter "C1==316," the modified query 504 instead contains the filter "C1>315 and C1<322." In an embodiment, other clauses are similarly modified, left as is, re-ordered, or removed. The modified query 504, as depicted by FIG. 5, may be expected to have a predicted result 506 comprising the same row as the original query 500, since each filter clause has been modified to be different than in the initial query but still encompasses the test data.

In an embodiment, a modified query 508 is generated based on the original query 500. The embodiment may modify the WHERE clause of the original query 500 such that the modified query 508 excludes the row. For example, as depicted by FIG. 5, the predicted results 510 of the modified query 508 are an empty set.

In an embodiment, a first query $Q_1$ directed at a dataset comprising a tuple $T_1$ may have an expected result of $T_1$ if the filter clauses of the query encompass $T_1$. A query $Q_2$ based on $Q_1$ may be modified such that its filter clauses also encompasses $T_1$, in which case the predicted result of $Q_2$ is also $T_1$. A query $Q_3$ based on $Q_1$ may be modified such that its filter clause excludes $T_1$, in which case the predicted result of $Q_3$ may be an empty set, assuming that the table to which $Q_3$ is directed contains only $T_1$. More generally, embodiments may predict results of a query based on analysis of the query's filter clauses with respect to the test data, or generate a query so that it is predicted to produce a given result, based on modifying the query's filter clauses in accordance with the test data and the predicted (i.e. desired) result.

In an embodiment, the initial query 500 may be modified iteratively. For example, the modified query 504 may be based on the initial query 500, and then a second modified query (not depicted) may be based on query 504, and so on. In an embodiment, the process is periodically restarted by generating a new set of test data and a new initial query.

In an embodiment, queries are generated using expression trees. An expression tree may comprise a tree or graph structure in which the nodes, leaves, and branches of the structure represent elements of the query. For example, in an embodiment the nodes of a tree may represent operators and the leaves of the tree may represent operands. More generally, the nodes, leaves, and branches of an expression tree represent the semantic and/or syntax of a query. In an embodiment, the nodes, leaves, and/or branches of an expression tree may be modified based on semantic and/or syntactic factors, and the modified tree used to generate a corresponding query.

Figure 6:
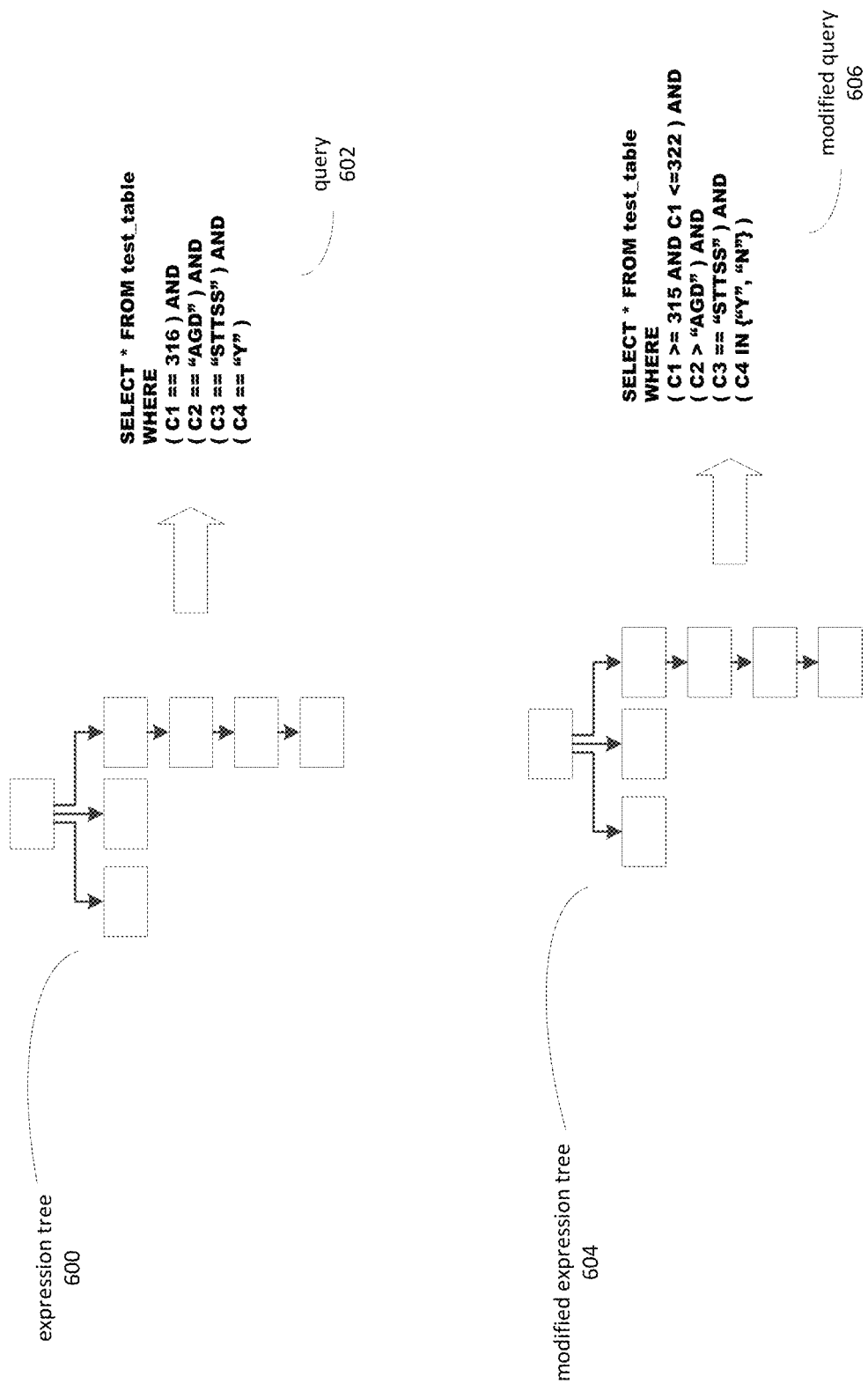
FIG. 6 depicts an embodiment of a database testing system modifying an expression tree.

FIG. 6 depicts an embodiment of a database testing system modifying an expression tree. In an embodiment, an expression tree 600 corresponds to a query 602. The nodes, leaves, and branches of the expression tree 600 may correspond to elements of the query 602. For example, a node of expression tree 600 might represent a WHERE clause, and other nodes & leaves descending from the WHERE clause might represent particular filters, such as "C1=316."

In an embodiment, the expression tree 600 is used to generate a modified expression tree 604. For example, the database testing system 100 may select certain nodes and/or leaves of the expression tree 600 for modification, and then modify those nodes and/or leaves to produce the modified expression tree 604. For example, the nodes and/or leaves representing "C1=316" might be changed to "C1>=315 AND C1<=322."

In an embodiment, a region of the expression tree 600 is changed based on transformation rules indicative of the semantic and/or syntactic meaning of the region. A region of an expression tree may be changed based at least in part on a randomization factor, and in part on rules indicative of the semantic and/or syntactic meaning of the region. For example, certain rules may indicate potential modifications to the portion of the expression tree, such that the potential modifications may be made in accordance with a predicted or desired result.

In an embodiment, transformation rules may be applied in combination with randomization factors to produce a new expression, and additional transformation rules may be applied to the expression tree to obtain a predicted result for the modified expression. In an embodiment, a set of transformation rules is associated with each type of node, leaf, or branch. For example, a set of transformation rules may be associated with a WHERE or filter clause, another set of transformation rules associated with a projection clause, another set of transformation rules associated with a join clause, and so on.

In an embodiment, a portion of the tree may be selected at random. In an embodiment, a transformation rule associated with the selected portion may be selected at random, and then evaluated based on additional randomization factors. The modified expression tree 604 may then be generated based on evaluation of the transformation rule. For example, a portion of the expression tree 600 might correspond to "C2=="AGD." This portion might be randomly selected. Then, a transformation rule might be selected at random. The selected transformation rule might indicate that the "==" operator may be substituted for a ">=" or "<=" operator. The selected transformation rule might further indicate what range of new values are permissible if the ">=" operator is selected for the transformation. Evaluation of the rule might then result in the modified expression tree containing "C2>="AGD."

Figure 7:
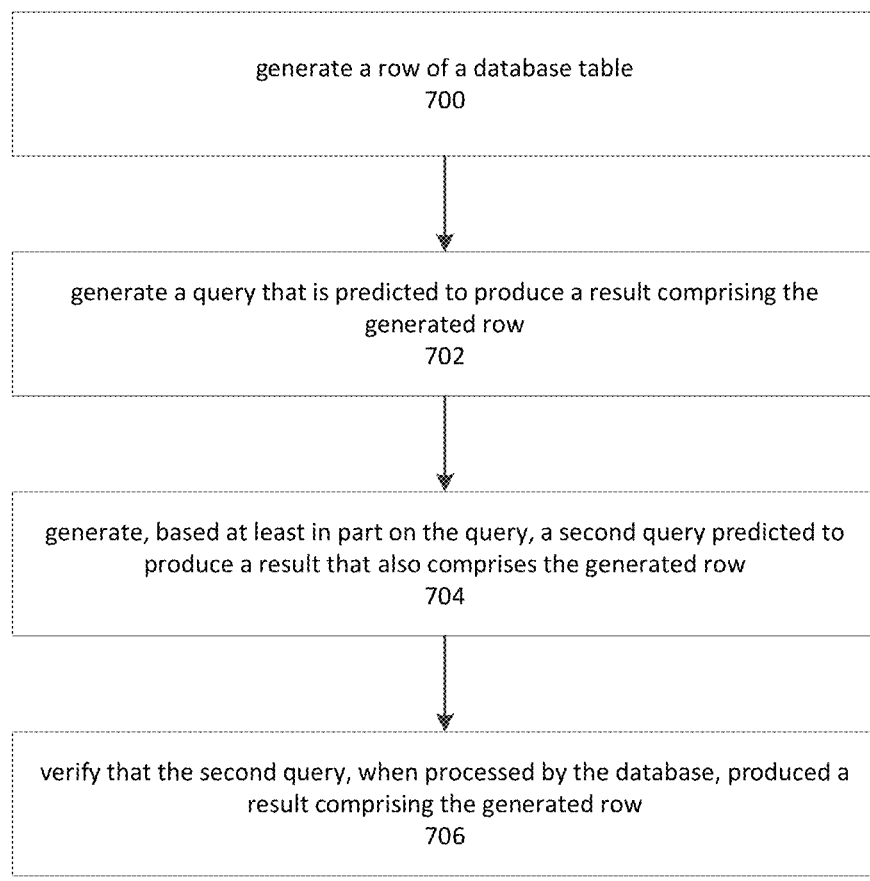
FIG. 7 is a flow diagram depicting aspects of an embodiment of a database testing system.

FIG. 7 depicts aspects of an embodiment of a database testing system. Although depicted as a sequence of elements, those of ordinary skill in the art will appreciate that the depicted order is intended to be illustrative, and as such should not be construed as limiting the scope of the present disclosure except where noted or logically required. In various embodiments, some of the depicted elements may be altered, omitted, reordered, combined with additional elements not depicted in the figure, or performed in parallel with other elements. Embodiments may be implemented in a system comprising a memory and at least one processor. The memory may comprise computer-executable instructions that, when executed by a computing system, cause the computing system to perform operations corresponding to the depicted elements. Further examples of such systems are described herein.

Element 700 depicts an embodiment generating a row of a database table. In an embodiment, the row is generated based on a tuple of test data having size, types, and values selected using a randomization process, in accordance with the techniques described in association with FIG. 2. In an embodiment, data definition language statements are then executed to create a database table whose column definitions conform to the generated tuple. The data definition statements may, for example, create a table comprising columns corresponding to each element of the tuple, and of a corresponding type. A data manipulation statement, such as a SQL insert, may then be executed to insert a row having the values of the tuple.

In an embodiment, a row of a database table is generated based at least in part on a randomization factor. In an embodiment, the randomization factor comprises one or more of a random number generator, a state machine, a stochastic model, or other mathematical model employing some form of randomization.

Element 702 depicts an embodiment generating a first query that is predicted to produce a first result comprising the generated row. In an embodiment, the query is generated so that the first query, when processed by a database, produces a result that comprises the generated row. In a further aspect of the embodiment, the system may generate the first query to comprise instructions to select the row.

Element 704 depicts an embodiment generating, based at least in part on the first query, a second query that is predicted, when processed by the database, to produce a second result which also comprises the generated row. In a further aspect of the embodiment, the system may generate the second query by modifying the first query in accordance with semantics of a query language, such that the second query comprises instructions to select the row. Note that the second instructions are different from the first instructions, in order to test a different aspect of the database's operations.

In an embodiment, the first query is generated in accordance with the semantics of the query language associated with the query. Here, semantics of the query language refers to the operation and syntax of the language. In an embodiment, modifying a query in accordance with the semantics of the query language comprises substituting a clause of the query with a replacement clause predicted, based on the operation and syntax of the query language, to produce the same result. The modification may further include selecting the replacement clause based at least in part on a randomization factor.

In an embodiment, the generated queries are associated with expression trees. The system may, for example, generate a query by generating an expression tree and converting the expression tree to the query. In an embodiment, the expression tree is generated, in accordance with the semantics of the associated query language, to represent a query that is predicted to produce, when processed by the database, a result which includes the generated row. In an embodiment, the expression tree is converted to the query prior to being processed by the database. In an embodiment, the expression tree is converted to the query by traversing the expression tree and forming a textual representation of the query.

In an embodiment, the second query is generated based on a second expression tree formed by modifying the first expression tree. The modification may be in accordance with the semantics of the associated query language, and may be made so that the second expression tree represents a query that is predicted to produce, when processed by the database, a result which includes the generated row. In an embodiment, a filter clause of the expression tree is added, deleted, or modified in a way that the values of the test data in the generated row are still encompassed by the modified filter clause.

Element 706 depicts an embodiment verifying that the second query, when processed by the database, produced the second result. As noted, the second result is expected to return the generated row provided that the database's actual functioning matches its expected functioning. In an embodiment, if the database's actual function is not as predicted, an error or test failure may be logged for subsequent investigation.

Figure 8:
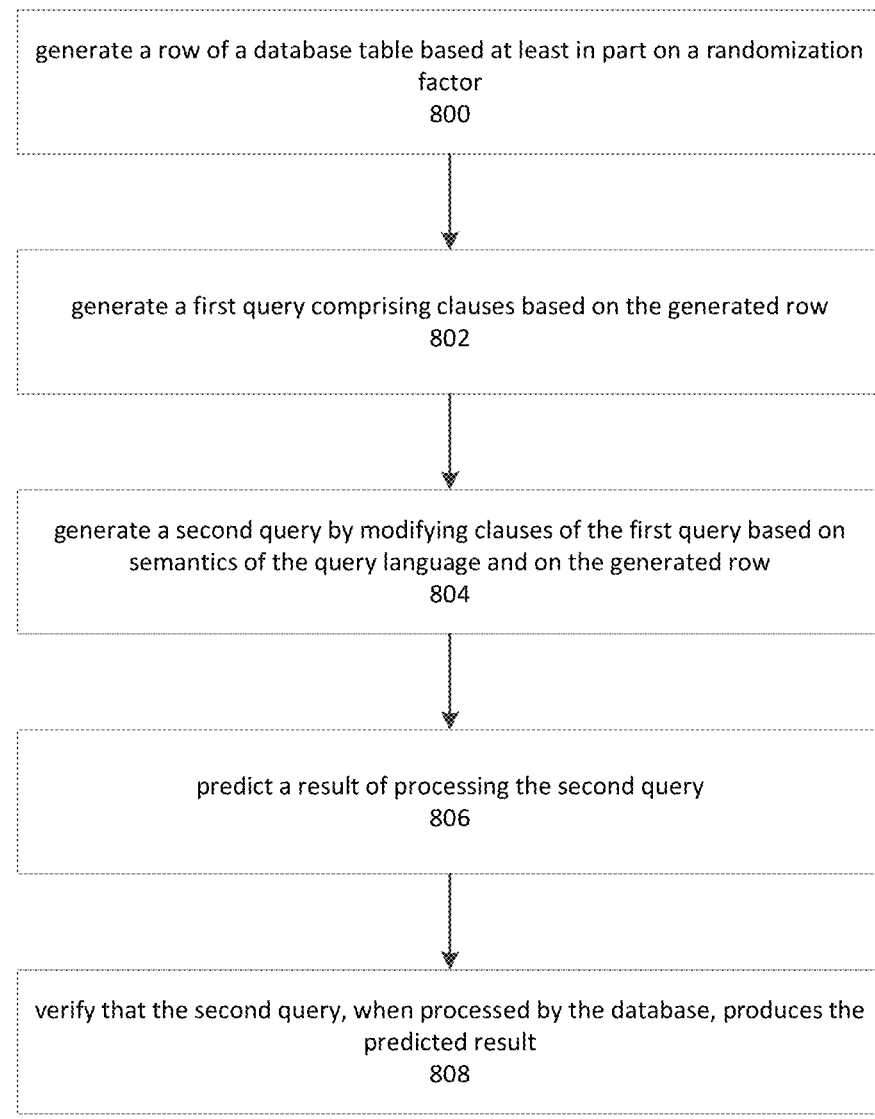
FIG. 8 is a flow diagram depicting aspects of an embodiment of a database testing system.

FIG. 8 depicts an embodiment of a database testing system. Although depicted as a sequence of elements, those of ordinary skill in the art will appreciate that the depicted order is intended to be illustrative, and as such should not be construed as limiting the scope of the present disclosure except where noted or logically required. In various embodiments, some of the depicted elements may be altered, omitted, reordered, combined with additional elements not depicted in the figure, or performed in parallel with other elements. Embodiments may be implemented in a system comprising a memory and at least one processor. The memory may comprise computer-executable instructions that, when executed by a computing system, cause the computing system to perform operations corresponding to the depicted elements. Further examples of such systems are described herein.

Element 800 depicts an embodiment generating a row of a database table based at least in part on a randomization factor. In an embodiment, this comprises the embodiment generating test data for the row by selecting a value from a range of values that are permissible for database type supported by the database. The type and the value may be selected based at least in part on a randomization factor.

Element 802 depicts an embodiment generating a first query which comprises clauses based on the generated row.

Element 804 depicts an embodiment generating a second query by modifying one or more clauses of the first query. The clauses are generated based on the semantics of the query language and on the generated row.

Element 806 depicts an embodiment predicting a result of processing the second query. In an embodiment, predicting a result of the second query is based on semantics of the associated query language(s). The results of the initial and modified query may be said to have correspondence based on the semantics of the query language. The correspondence may be predicted, either proactively by modifying the query to produce a desired correspondence, or retroactively by modifying and then analyzing the query. The correspondence may be of one or more types, including but not limited to the second result being a subset, opposite, inverse, converse, obverse, or negation of the first result.

Element 808 depicts an embodiment verifying that the second query, when processed by the database, produces the predicted result. In an embodiment, the system causes a query to be processed by the database and examines the result set that is obtained by the processing. If the result was predicted to return a generated row, the verification may succeed if the actual result includes the generated row. Likewise, if the result was predicted to exclude the generated row, the verification may succeed if the actual result does not include the generated row.

Figure 9:
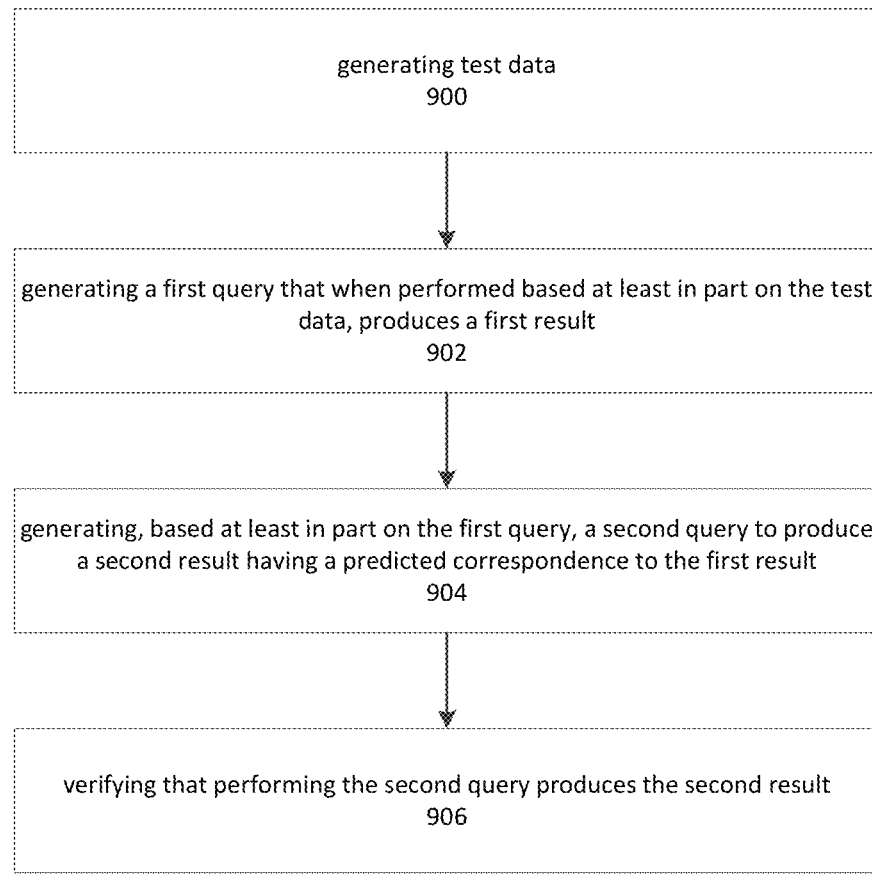
FIG. 9 is a flow diagram depicting an embodiment of a process for performing database validation.

FIG. 9 depicts an embodiment of a process for performing database validation. Although depicted as a sequence of elements, those of ordinary skill in the art will appreciate that the depicted order is intended to be illustrative, and as such should not be construed as limiting the scope of the present disclosure except where noted or logically required. In various embodiments, some of the depicted elements may be altered, omitted, reordered, combined with additional elements not depicted in the figure, or performed in parallel with other elements. Embodiments of the depicted process may be implemented in a system comprising a memory and at least one processor. The memory may comprise computer-executable instructions that, when executed by a computing system, cause the computing system to perform operations corresponding to the depicted elements. Further examples of such systems are described herein.

Element 900 depicts generating test data. In an embodiment, the test data is generated by at least selecting a value from a range of values permissible for a database type, where the value is selected based at least in part on a randomization factor. In an embodiment, the generated test data is then inserted as a row of a database table. In an embodiment, the system generates a database table capable of holding rows that include the generated test data.

In an embodiment, generating test data may comprise identifying a data type that is storable in a column of a database table. In an embodiment, this is followed by determining a range of values that are associated with the data type, followed by generating the test data so that it comprises a value that is within the range.

Element 902 depicts generating a query that, when performed based at least in part on the test data, produces a result. In an embodiment, the query is written so that, when processed by a database, the results of the processing comprise the generated test data. In another embodiment, the result is based on the test data. In an embodiment, the query is generated so that it comprises filter clauses that identify a row comprising the generated test data, and a select clause to project the identified row into the result set.

In an embodiment, the query is generated as an expression tree. In an embodiment, a node of the expression tree represents a "where" clause, and comprises sub-nodes which represent filter clauses.

Element 904 depicts generating, based at least in part on the query, a second query to produce a second result having a predicted correspondence to the first result. In an embodiment, the correspondence between the first and second results is predicted based on semantics of the query language associated with the queries. The prediction may comprise one or both of forming the second query so that it is expected to produce a desired result, or subsequently analyzing the second query to determine what result should be expected by executing it.

In an embodiment, the correspondence of the second result comprises being one of a subset, opposite, inverse, converse, obverse, or negation of the first result. For example, the original query might be modified such that, instead of identifying a row that comprises the test data, the modified query identifies only rows that do not contain the generated row.

In an embodiment, the second query is generated from a second expression tree which is based, in turn, on the first expression tree. The second expression tree may primarily comprise the nodes of the first expression tree, but with certain portions substituted, deleted, or rearranged to represent a different query than the original. The affected portions may be selected based on a randomization factor.

In an embodiment, filter clauses in the expression tree are replaced so that the modified query no longer refers to precisely the same set of data as the first query. In an embodiment, the filter clauses of the second expression are modified to be different but still encompass the same area. For example, a WHERE clause in a SQL query may be said to define a region of an n-dimensional space. A tuple of randomly selected values may be said to occupy a point within the n-dimensional space. In an embodiment, aspects of a WHERE clause are modified so that they define a different region in the n-dimensional space defined by the original query. This may be accomplished, for example, by modifying a filter clause to adjust its range parameters. However, the new region may still encompass the point in the space defined by the tuple. If the new region does not encompass the point, the results of performing the modified query may nevertheless be predicted based on this observation.

Element 906 depicts verifying that the performing the second query produces the second result.

Figure 10:
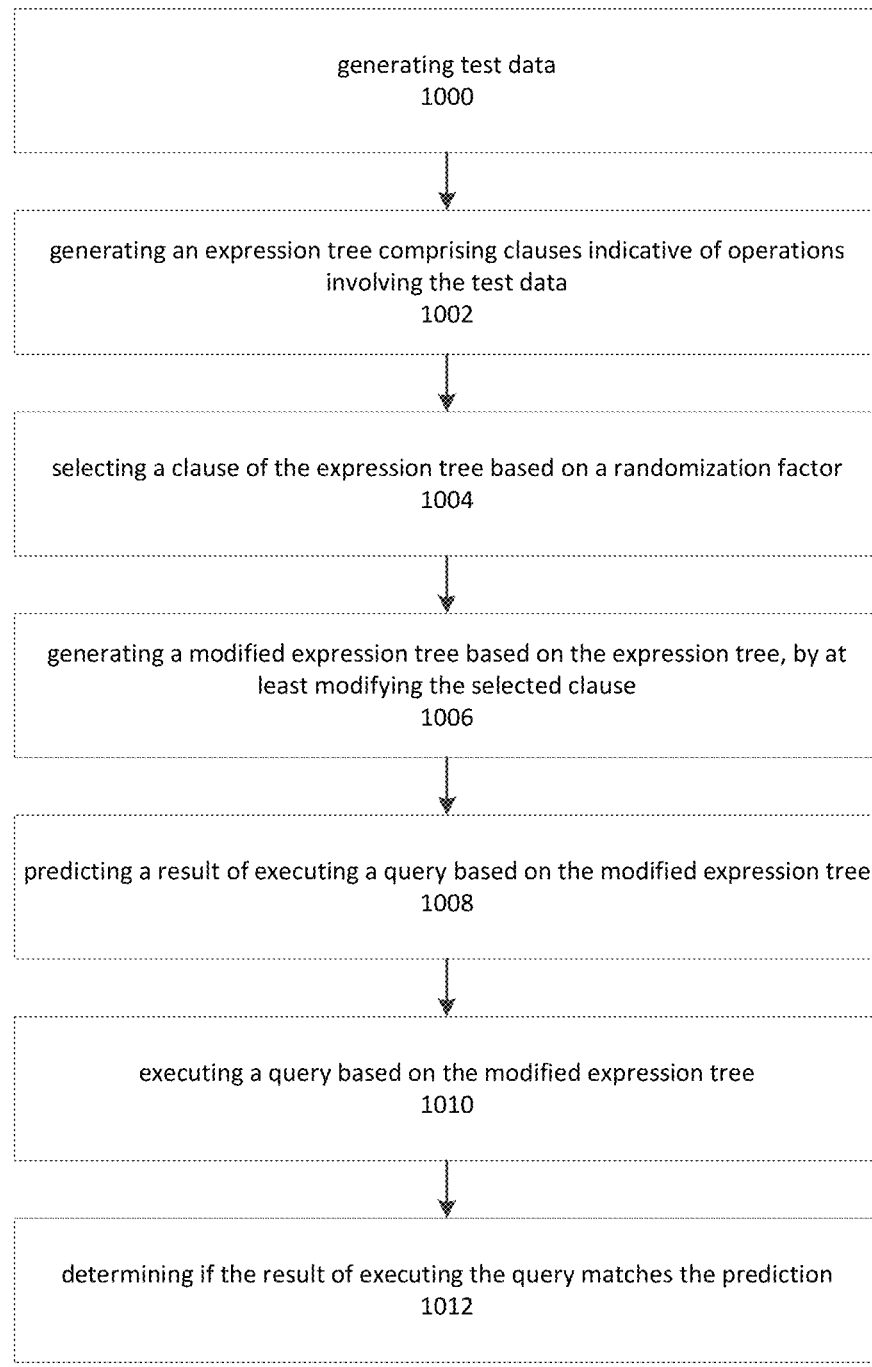
FIG. 10 is a flow diagram depicting an embodiment of a process for testing a database using expression trees.

FIG. 10 depicts an embodiment of a process for testing a database using expression trees. Although depicted as a sequence of elements, those of ordinary skill in the art will appreciate that the depicted order is intended to be illustrative, and as such should not be construed as limiting the scope of the present disclosure except where noted or logically required. In various embodiments, some of the depicted elements may be altered, omitted, reordered, combined with additional elements not depicted in the figure, or performed in parallel with other elements. Embodiments of the depicted process may be implemented in a system comprising a memory and at least one processor. The memory may comprise computer-executable instructions that, when executed by a computing system, cause the computing system to perform operations corresponding to the depicted elements. Further examples of such systems are described herein.

Element 1000 depicts generating test data. In an embodiment, a database table is defined. Next, one or more rows of test data are generated and inserted into the table. The number and types of the columns of the table may be selected based at least in part on a randomization factor. The values of each row may be generated, based at least in part on a randomization factor, in view of the permissible range of values for each type.

Element 1002 depicts generating an expression tree comprising clauses indicative of operations involving the test data. The expression tree may represent instructions for performing an operation on the test data, such as instructions for performing a query of the database table.

Element 1004 depicts selecting a clause of the expression tree based on a randomization factor. Element 1006 depicts generating a second expression tree based on the first expression tree, by at least modifying the selected clause of the first expression tree.

In an embodiment, a clause is added to the expression tree. The added clause is generated based at least in part on a randomization factor.

In an embodiment, a clause is removed from the expression tree. The removed clause is selected based at least in part on a randomization factor.

Element 1008 depicts predicting a result of executing a query based on the modified expression tree. The prediction may be based on generating the query so that it may be expected to generate a desired result, or analyzing the query after it has been generated to determine what the result should be.

Element 1010 depicts executing a query based on the modified expression tree. In an embodiment, the query is generated by traversing the expression tree and accumulating textual elements of the query in a buffer. The system may then cause the query to be executed by transmitting the contents of the buffer to the database. Element 1010 may be followed by element 1012, which depicts determining if the result of executing the query matches the prediction.

Figure 11:
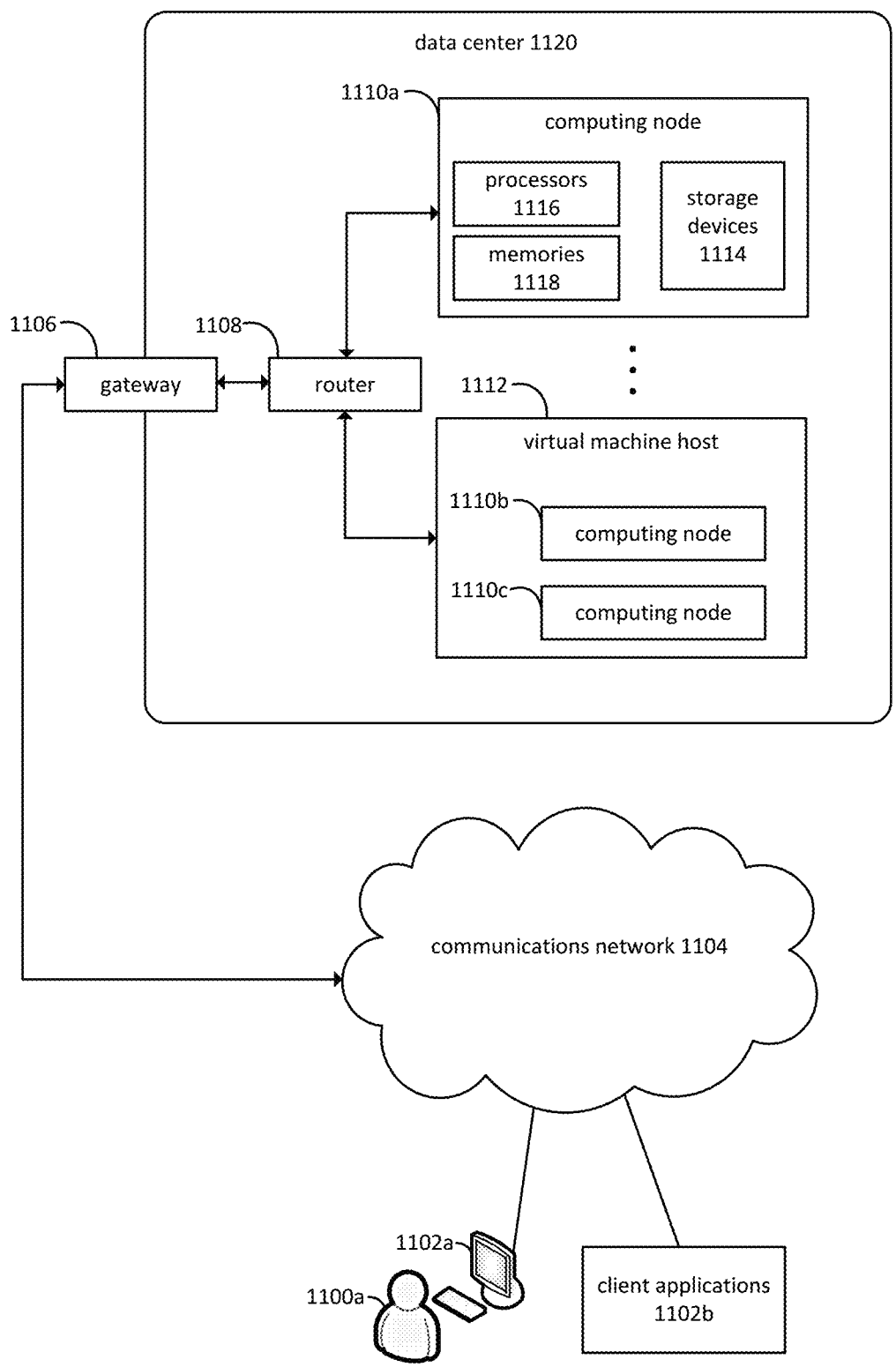
FIG. 11 depicts an embodiment of a computing environment in which aspects of the present disclosure may be practiced.

FIG. 11 is a diagram depicting an example of a distributed computing environment on which aspects of the present invention may be practiced. Various users 1100*a* may interact with various client applications, operating on any type of computing device 1102*a*, to communicate over communications network 1104 with processes executing on various computing nodes 1110*a*, 1110*b*, and 1110*c* within a data center 1120. Alternatively, client applications 702*b* may communicate without user intervention. Communications network 704 may comprise any combination of communications technology, including the Internet, wired and wireless local area networks, fiber optic networks, satellite communications, and so forth. Any number of networking protocols may be employed.

Communication with processes executing on the computing nodes 1110*a*, 1110*b*, and 1110*c*, operating within data center 1120, may be provided via gateway 1106 and router 1108. Numerous other network configurations may also be employed. Although not explicitly depicted in FIG. 11, various authentication mechanisms, web service layers, business objects, or other intermediate layers may be provided to mediate communication with the processes executing on computing nodes 1110*a*, 1110*b*, and 1110*c*. Some of these intermediate layers may themselves comprise processes executing on one or more of the computing nodes. Computing nodes 1110*a*, 1110*b*, and 1110*c*, and processes executing thereon, may also communicate with each other via router 1108. Alternatively, separate communication paths may be employed. In some embodiments, data center 1120 may be configured to communicate with additional data centers, such that the computing nodes and processes executing thereon may communicate with computing nodes and processes operating within other data centers.

Computing node 1110*a* is depicted as residing on physical hardware comprising one or more processors 1116, one or more memories 1118, and one or more storage devices 1114. Processes on computing node 1110*a* may execute in conjunction with an operating system or alternatively may execute as a bare-metal process that directly interacts with physical resources, such as processors 1116, memories 1118, or storage devices 1114.

Computing nodes 1110*b* and 1110*c* are depicted as operating on virtual machine host 1112, which may provide shared access to various physical resources, such as physical processors, memory, and storage devices. Any number of virtualization mechanisms might be employed to host the computing nodes.

The various computing nodes depicted in FIG. 11 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 12:
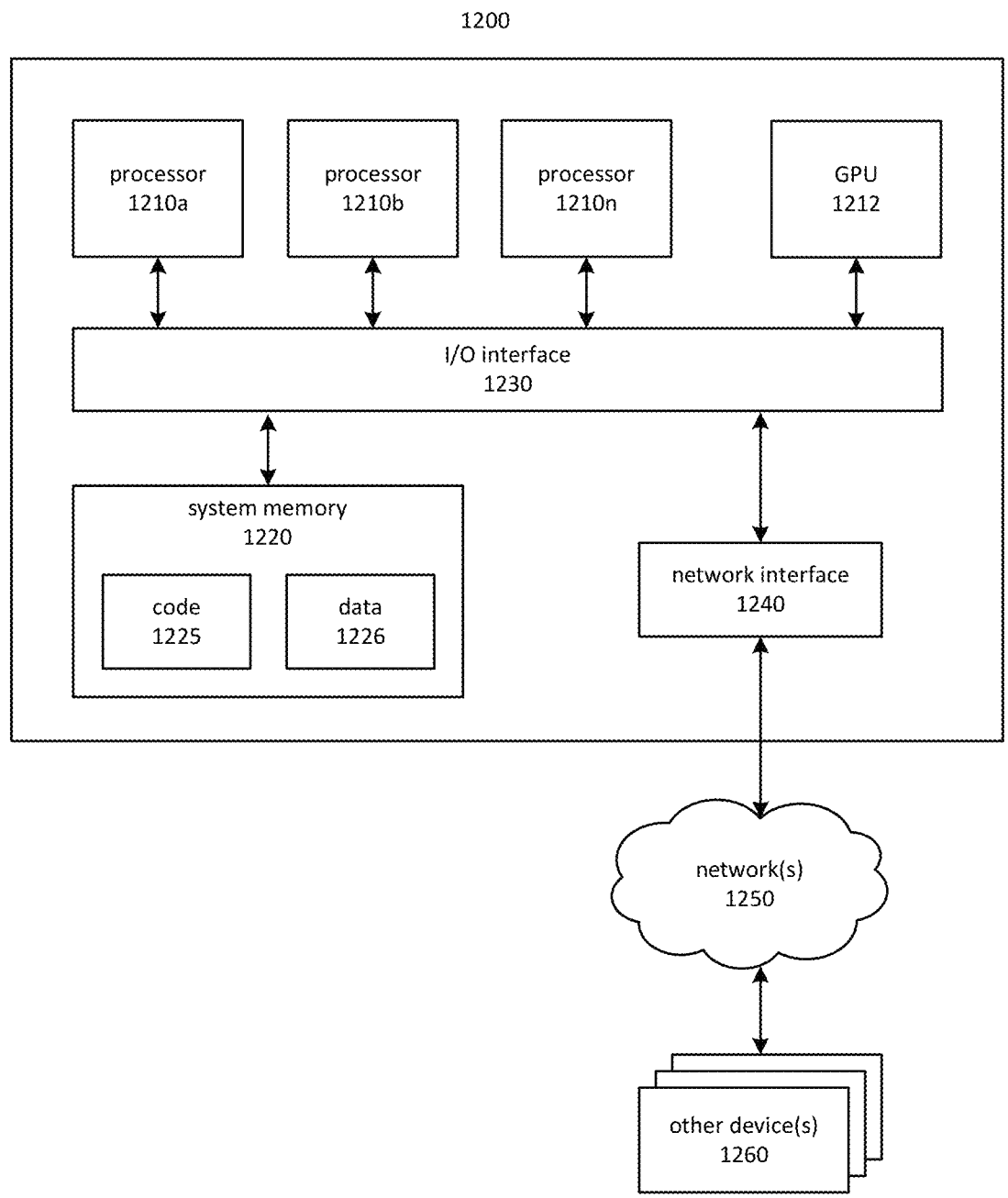
FIG. 12 depicts an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 12 depicts a general-purpose computer system that includes or is configured to access one or more computer-accessible media. In the illustrated embodiment, computing device 1200 includes one or more processors 1210*a*, 1210*b*, and/or 1210*n* (which may be referred herein singularly as a processor 810 or in the plural as the processors 1210) coupled to a system memory 1220 via an input/output ("I/O") interface 1230. Computing device 1200 further includes a network interface 1240 coupled to I/O interface 1230.

In various embodiments, computing device 1200 may be a uniprocessor system including one processor 1210 or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures ("ISAs"), such as the x86, PowerPC, SPARC or MIPS ISAs, or any other suitable ISA. In multiprocessor systems, each of processors 1210 may commonly, but not necessarily, implement the same ISA.

In some embodiments, a graphics processing unit ("GPU") 1212 may participate in providing graphics rendering and/or physics processing capabilities. A GPU may, for example, comprise a highly parallelized processor architecture specialized for graphical computations. In some embodiments, processors 1210 and GPU 1212 may be implemented as one or more of the same type of device.

System memory 1220 may be configured to store instructions and data accessible by processor(s) 1210. In various embodiments, system memory 1220 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 1220 as code 1225 and data 1226.

In one embodiment, I/O interface 1230 may be configured to coordinate I/O traffic between processor 1210, system memory 1220, and any peripherals in the device, including network interface 1240 or other peripheral interfaces. In some embodiments, I/O interface 830 may perform any necessary protocol, timing or other data transformations to convert data signals from one component (e.g., system memory 1220) into a format suitable for use by another component (e.g., processor 1210). In some embodiments, I/O interface 830 may include support for devices attached through various types of peripheral buses, such as a variant of the Peripheral Component Interconnect ("PCI") bus standard or the Universal Serial Bus ("USB") standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computing device 1200 and other device or devices 860 attached to a network or networks 1250, such as other computer systems or devices, for example. In various embodiments, network interface 1240 may support communication via any suitable wired or wireless general data networks, such as types of Ethernet networks, for example. Additionally, network interface 1240 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1220 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 1200 via I/O interface 1230. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1200 as system memory 1220 or another type of memory. Further, a computer-accessible medium may include transmission media or signals, such as electrical, electromagnetic or digital signals, conveyed via a communication medium, such as a network and/or a wireless link, such as those that may be implemented via network interface 1240. Portions or all of multiple computing devices, such as those illustrated in FIG. 12, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

The system memory 1220 may be reconfigured by the operation of one or more of the processors 1210. The processors 1210 may execute the instructions of a code module and thereby reconfigure the system memory 1220 to form data structures and data elements. Forming a data element may therefore refer to operations of the processor 810 to reconfigure the system memory 1220. The GPU 1212, network interface 1240, and I/O interface may also, in some cases, form data structures by reconfiguring the system memory 1220. Accordingly, the terms "form" and "forming" may also refer to the operations of these and other devices 1260 which may cause the a data structure or data element to be stored in the system memory 1220.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
a memory to store machine-readable instructions, which as a result of being performed by a processor, cause the system at least to:
generate a row of a database table;
generate a first query that, when processed by the database, produces a first result comprising the row;
generate, based at least in part on the first query, a second query predicted to return a second result comprising the row when processed by the database; and
verify that the second query, when processed by the database, produced the second result.

2. The system of claim 1, the memory to store machine-readable instructions, which as a result of being performed by a processor, cause the system at least to:
generate the first query to comprise first instructions to select the row; and
generate the second query by modifying the first query, in accordance with semantics of a query language, to comprise second instructions to select the row, the second instructions different from the first instructions.

3. The system of claim 2, wherein modifying the first query in accordance with the semantics of a query language comprises substituting a clause of the first query with a replacement clause selected based at least in part on a randomization factor.

4. The system of claim 1, wherein the row of the database table is generated based at least in part on a randomization factor.

5. The system of claim 1, the memory to store machine-readable instructions, which as a result of being performed by a processor, cause the system at least to:
generate a first expression tree corresponding to the first query that, when executed, selects a row of a database table comprising the test data; and
generate the second query based on generating a second expression tree based at least in part on the first expression tree, wherein the second query, when executed, selects the row of the database table comprising the test data.

6. A method, comprising:
generating test data;
generating a first query that, when performed based at least in part on the test data, produces a first result;
generating, based at least in part on the first query, a second query to produce, when performed based at least in part on the test data, a second result having a predicted correspondence to the first result; and
verifying that performing the second query produces the second result.

7. The method of claim 6, further comprising:
generating the test data by at least selecting a value from a range of values permissible for a database type, the value selected based at least in part on a randomization factor.

8. The method of claim 6, wherein the correspondence between the first and second results is predicted based on semantics of a query language associated with the first and second queries.

9. The method of claim 6, wherein the first query selects, from a database table, a row comprising the test data and the second query is generated to select the row.

10. The method of claim 6, wherein the second result is one of a subset, opposite, inverse, converse, obverse, or negation of the first result.

11. The method of claim 6, further comprising:
generating a first expression tree indicative of the first query; and
generating a second expression tree based at least in part on the first expression tree, wherein the second expression tree is indicative the second query.

12. The method of claim 6, further comprising:
generating the first query to comprise a filter clause; and
generating the second query to comprise a modified version of the filter clause.

13. The method of claim 12, wherein the modified version of the filter clause comprises modified range parameters.

14. A non-transitory computer-readable storage medium having stored thereon executable instructions that, upon execution by a computing device, cause the computing device at least to:
  generate test data;
  generate first instructions, wherein the first instructions, when performed based on the test data, produce a first result, the first instructions comprised in a first database query;
  generate second instructions based on the first instructions, wherein the second instructions, when performed based at least in part on the test data, produce a second result with a predicted correspondence to the first result, the second instructions comprised in a second database query; and
  verify that performing the second instructions produces the second result.

15. The non-transitory computer-readable storage medium of claim 14, comprising further instructions that, upon execution, cause the computing device to at least:
  store a row of a database table comprising the test data.

16. The non-transitory computer-readable storage medium of claim 14, comprising further instructions that, upon execution, cause the computing device to at least:
  generate a database table to comprise at least one row, the at least one row comprising the test data.

17. The non-transitory computer-readable storage medium of claim 14, comprising further instructions that, upon execution, cause the computing device to at least:
  identify a data type of a column of a database table;
  determine a range of values associated with the data type; and
  generate the test data to comprise data within the range.

18. The non-transitory computer-readable storage medium of claim 14, comprising further instructions that, upon execution, cause the computing device to at least:
  generate a first expression tree indicative of a first query that, when executed, will select the test data; and
  generate a second expression tree based at least in part on the first expression tree, wherein the second expression tree is indicative of a second query that, when executed, will select one of an empty set, a subset of the test data, or a complement of the test data.

19. The non-transitory computer-readable storage medium of claim 14, wherein the first instructions comprise an expression tree.

20. The non-transitory computer-readable storage medium of claim 14, wherein test data, first instructions, and second instructions are each based at least in part on one or more randomization factors.

* * * * *